United States Patent
Zoske

(10) Patent No.: US 10,730,717 B2
(45) Date of Patent: Aug. 4, 2020

(54) HOSE MOVER

(71) Applicant: Mick Zoske, Iowa Falls, IA (US)

(72) Inventor: Mick Zoske, Iowa Falls, IA (US)

( * ) Notice: Subject to any disclaimer, the term of this patent is extended or adjusted under 35 U.S.C. 154(b) by 0 days.

(21) Appl. No.: 15/569,590

(22) PCT Filed: Apr. 29, 2016

(86) PCT No.: PCT/US2016/030203
§ 371 (c)(1),
(2) Date: Oct. 26, 2017

(87) PCT Pub. No.: WO2016/176619
PCT Pub. Date: Nov. 3, 2016

(65) Prior Publication Data
US 2018/0297811 A1 Oct. 18, 2018

Related U.S. Application Data

(60) Provisional application No. 62/154,498, filed on Apr. 29, 2015.

(51) Int. Cl.
*B65H 75/42* (2006.01)
*B65H 57/14* (2006.01)
*A01B 63/02* (2006.01)

(52) U.S. Cl.
CPC ........... *B65H 75/425* (2013.01); *A01B 63/02* (2013.01); *B65H 57/14* (2013.01); *B65H 2701/33* (2013.01)

(58) Field of Classification Search
CPC .. B65H 75/425; B65H 57/14; B65H 2701/33; A01B 63/02
See application file for complete search history.

(56) References Cited

U.S. PATENT DOCUMENTS

| | | | | |
|---|---|---|---|---|
| 1,017,936 A | * | 2/1912 | Welty | B65H 49/30 242/407.1 |
| 1,984,738 A | * | 12/1934 | Gleason | B65H 75/20 242/118.6 |
| 2,069,695 A | * | 2/1937 | Brown | F42D 1/045 242/580 |
| 2,092,731 A | * | 9/1937 | Foukal | B65H 75/14 242/613.4 |
| 2,935,996 A | * | 5/1960 | Anderson | B65H 75/20 137/355.26 |
| 3,160,362 A | * | 12/1964 | Weber | B65H 75/24 242/118.6 |
| 3,186,659 A | * | 6/1965 | Arnold | B65H 75/364 242/129 |
| 3,504,866 A | * | 4/1970 | Palynchuk | E21B 19/22 242/399.1 |
| 3,627,224 A | * | 12/1971 | Diggs | A01G 25/095 242/390.7 |
| 3,731,886 A | * | 5/1973 | Macchi | B21C 47/28 242/129 |
| 4,325,521 A | * | 4/1982 | Homersham | F16L 3/01 239/273 |
| 4,903,911 A | * | 2/1990 | Sepka | B65H 75/40 15/315 |

(Continued)

*Primary Examiner* — William A. Rivera
(74) *Attorney, Agent, or Firm* — David M. Breiner; BrownWinick Law Firm

(57) ABSTRACT

In accordance with example embodiments, a hose mover and a system for moving a hose are provided.

19 Claims, 13 Drawing Sheets

(56) References Cited

U.S. PATENT DOCUMENTS

| | | | | | |
|---|---|---|---|---|---|
| 4,962,650 | A | * | 10/1990 | Hahm | B65H 75/24 |
| | | | | | 242/118 |
| 5,083,722 | A | * | 1/1992 | Briggs | B65H 49/32 |
| | | | | | 242/390.2 |
| 5,381,981 | A | * | 1/1995 | Nelson | B65H 75/14 |
| | | | | | 137/355.27 |
| 5,954,294 | A | * | 9/1999 | Forsner | B65H 54/58 |
| | | | | | 242/604 |
| 8,864,428 | B2 | * | 10/2014 | Basler | B65H 75/20 |
| | | | | | 410/48 |
| 8,869,580 | B2 | * | 10/2014 | Basler | B21C 47/04 |
| | | | | | 72/183 |
| 10,150,402 | B2 | * | 12/2018 | White | B60P 1/16 |
| 2005/0045759 | A1 | * | 3/2005 | Hibbs | B65H 49/305 |
| | | | | | 242/588.2 |
| 2007/0235577 | A1 | * | 10/2007 | Brennan | B65H 49/327 |
| | | | | | 242/422 |
| 2016/0159609 | A1 | * | 6/2016 | Anderson | B65H 75/14 |
| | | | | | 242/397 |

\* cited by examiner

HOSE MOVER

CROSS REFERENCE TO RELATED APPLICATIONS

This application is a 371 of international PCT/US2016/030203 which was filed Apr. 29, 2016, which also claims the benefit of U.S. Provisional Patent Application No. 62/154,498 filed on Apr. 29, 2015 at the United States Patent and Trademark Office, the entire contents of which is hereby incorporated by reference.

BACKGROUND

1. Field

Example embodiments relate to hose mover and a method for moving a hose.

2. Description of the Related Art

Hose movers are used in the agricultural industry to move hoses lying in a field and position them for use by applicators. Hose movers are also used to keep hoses from kinking. In the conventional art, the hose movers generally attach to a back of a tractor and are comprised of a hitch, a frame, and a wheel. FIG. 1 is an example of a prior art hose mover wheel 100.

Conventional hose mover wheels 100 generally include three structures: a pickup structure 110, a trapping structure 170, and a band 140 between the pickup structure 110 and the trapping structure 170. The wheels 100 also generally include a bearing housing 190 enclosing a bearing 130 to allow the wheel 100 to rotate freely. In the conventional art the band 140 resembles a short hollow cylinder. The walls of the band 140 are typically flat and without apertures. When used, a hose on the ground may be scooped off the ground and moved by the pickup structure 110. FIG. 2A, for example, shows a hose 400 resting on the ground with a wheel 100 of a conventional hose mover arranged next to it. In the conventional art, the hose mover is generally manipulated by operation of a tractor and/or three point hitch so that the pickup structure 110 is inserted underneath or near a bottom of the hose 400. The hose mover is further moved so the hose 400 is on the pickup structure 110 and thereafter bears against the band 140. The hose 400 is prevented from slipping off the band 140 by the trapping structure 170 as shown in FIG. 2B.

SUMMARY

The inventor has noticed several problems with conventional hose movers. For example, because conventional hose movers utilize solid bands between a pickup structure and a trapping structure, mud from hoses generally cannot escape the band and therefore build up on the band. This interferes with how a hose may be moved. This problem is further confounded when the hose movers are used in cold weather due to mud freezing on the band. The inventor has sought to cure these problems. As a result the inventor has developed a novel and nonobvious type of hose mover. As will be shown, inventor has invented hose mover having a concave region rather than a solid band. The concave region, for example, may be comprised of closely spaced rings with gaps therebetween to allow mud to flow between the rings. In another nonlimiting embodiment, the concave region may resemble a conventional band but only curved inwards to form the concave shape. In this latter embodiment, the band may have apertures to allow mud to flow therethrough to reduce a build up of mud on the concave region. In example embodiments, the concave region, therefore, solves the aforementioned problems by allowing mud from the hose to pass through openings in the concave region (for example, spacing between rings or apertures of a curved plate) thereby reducing mud buildup on the hose mover. In addition, the concave shape allows the hose mover to better grip a hose, a feature which the traditional band having flat walls, does not have. Although exemplified as a hose mover in the agricultural field, the hose mover of example embodiments may be used in other industries such as the oil and gas industry to move flexible pipe. As such, the inventive features disclosed herein are not strictly limited to use in the agricultural industry.

In accordance with example embodiments, a hose mover may be comprised of a pickup structure, a trapping structure, and a concave region between the pickup structure and the trapping structure.

BRIEF DESCRIPTION OF THE DRAWINGS

Example embodiments are described in detail below with reference to the attached drawing figures, wherein.

DETAILED DESCRIPTION

Figure 1:
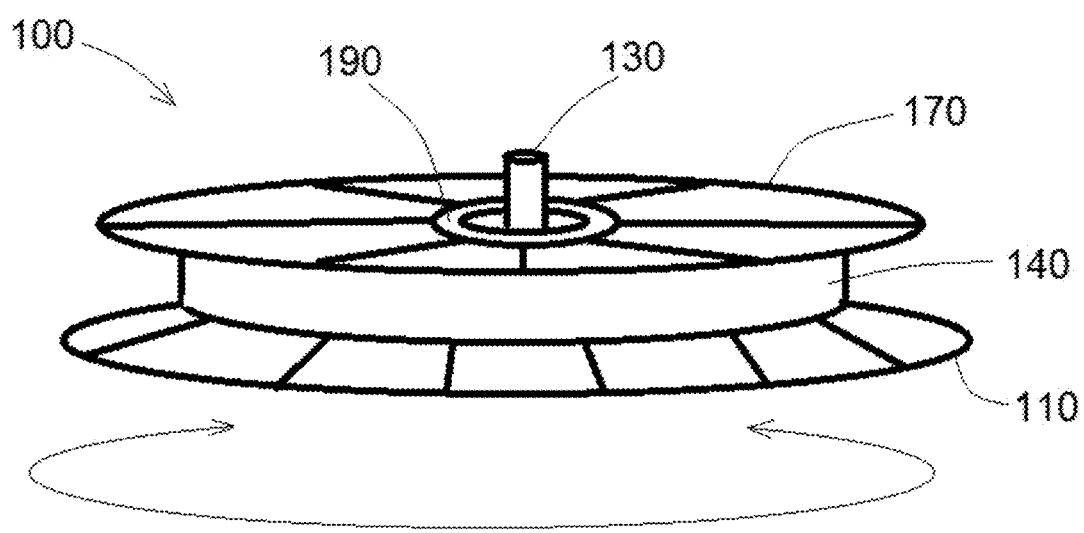
FIG. 1 is a view of a hose mover wheel in accordance with the prior art.
Figure 2A:
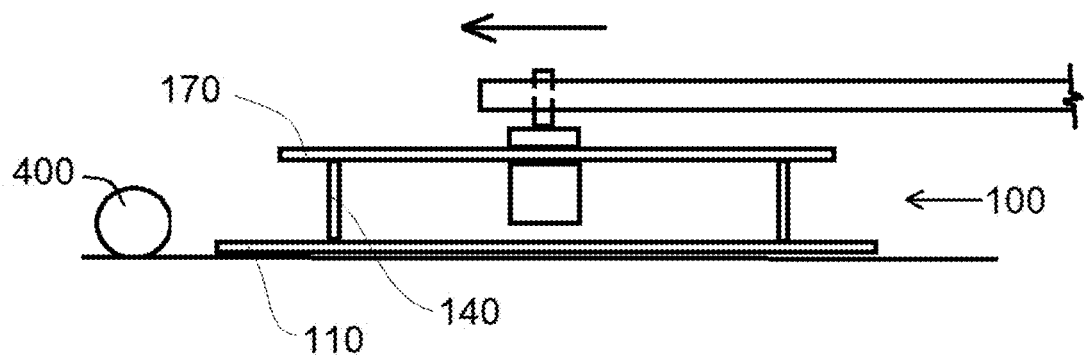
FIGS. 2A and 2B are views of a conventional hose mover wheel near and in contact with a hose in accordance with the prior art.
Figure 2B:
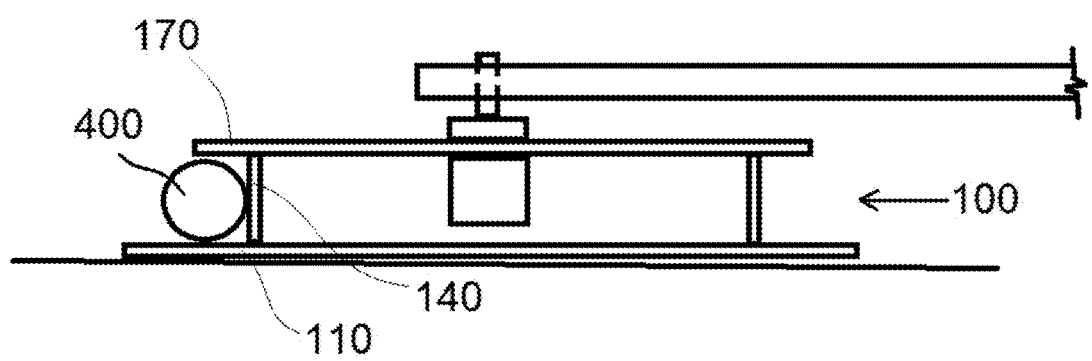

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a hose mover and a method of moving a hose.

Figure 3A:
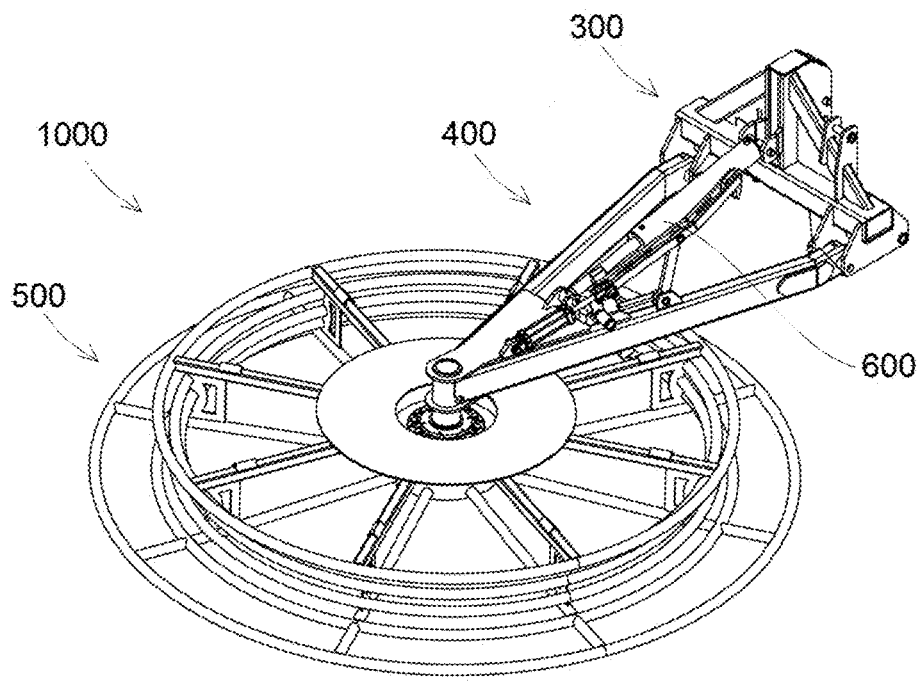
FIGS. 3A-3C are views of a hose mover in accordance with example embodiments.
Figure 3B:
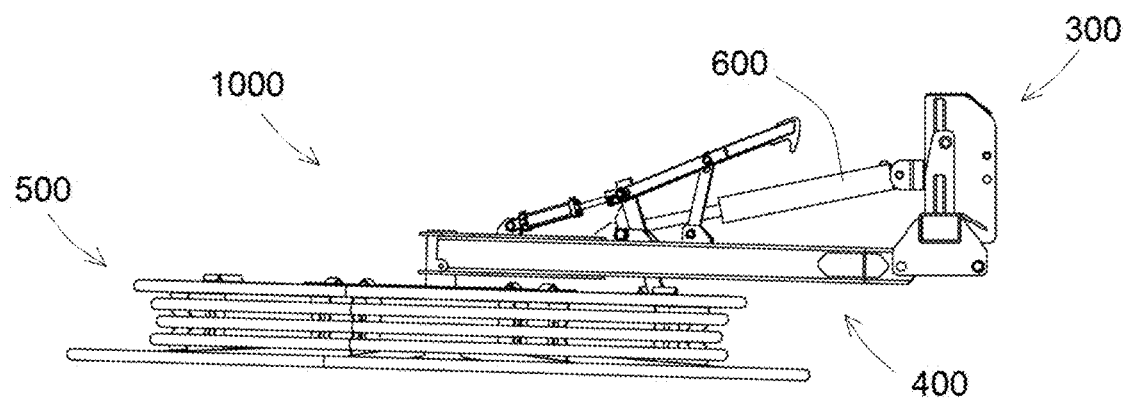
Figure 3C:
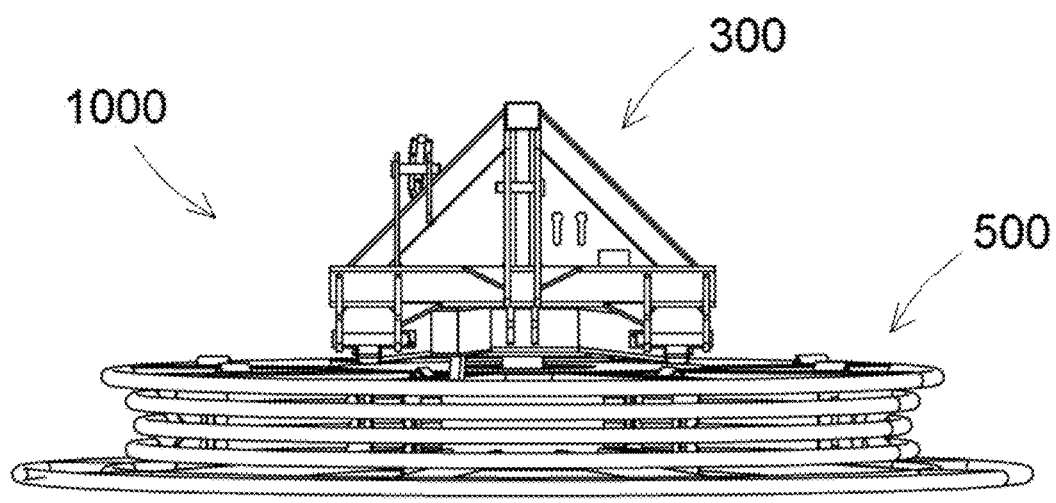

FIGS. 3A-3C are various views of a hose mover 1000 in accordance with example embodiments. As shown in FIGS. 3A-3C the hose mover 1000 is comprised of hitch 300, a frame 400 pivotally attached to the hitch 300, and a wheel 500. In example embodiments the hitch 300 may connect to a vehicle such as, but not limited to, a tractor, allowing the entire hose mover 1000 to move from one location to another by the vehicle. In example embodiments, the hose mover 1000 may further comprise a first actuator 600 which may be connected to each of the hitch 300 and the frame 400. The first actuator 600 may be, but is not required to be, a hydraulic cylinder. In example embodiments the first actuator 600 may be controlled to pivot the frame 400 with respect to the hitch 300 thereby raising or lowering the wheel 500.

Figure 4A:
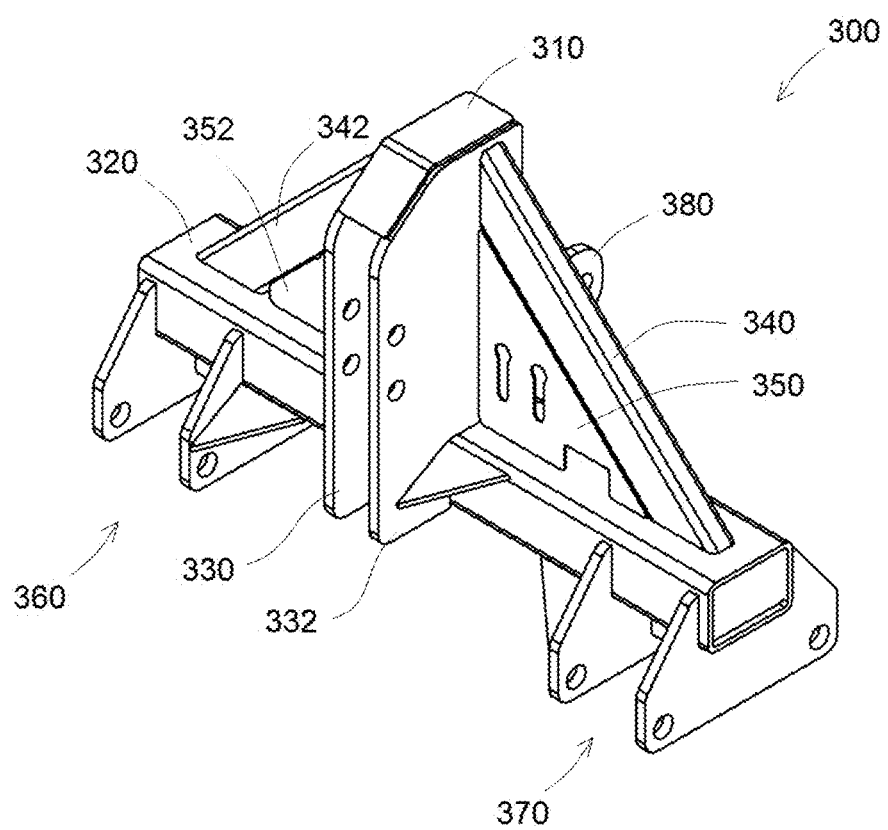
FIGS. 4A and 4B are views of a hitch in accordance with example embodiments.
Figure 4B:
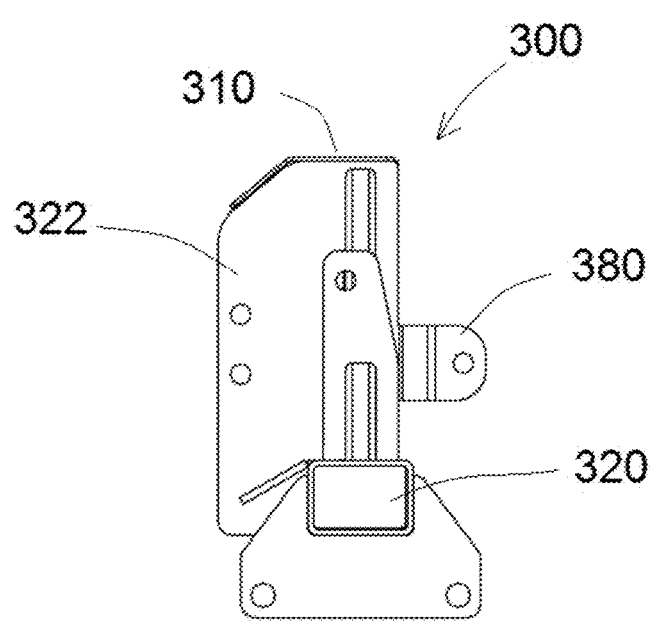

FIG. 4A is a perspective view of the hitch 300 and FIG. 4B is a side view of the hitch 300. In the nonlimiting example of FIGS. 4A and 4B, the hitch 300 is comprised of a first structural member and a second structural member 320 welded together to form a substantially T-shape. In example embodiments, the first structural member and the second structural member 320 may be made from tube steel, however, the invention is not limited thereto as the first structural member and the second structural member 320 may be made from another type of structural member such as, but not limited to, I-beams, W-shapes, and channel iron. In example embodiments, the first structural member may include plates 330 and 332 welded thereto. The plates 330 and 332 may have holes which may allow the hitch 300 to attach to a vehicle, for example a tractor. Additional plates with holes may be provided at ends of the second structural member 320 to allow for additional connecting regions 360 and 370 to connect the hitch 300 to the vehicle. The connecting regions 360 and 370 may also be configured to allow the frame 400 to attach thereto. For example, the connecting regions 360 and 370 may include holes which allow ends of the frame 400 to attach thereto. For example, the frame 400 may include pins or protrusions 412 and 422 which may connect to the hitch 300 by connecting regions 360 and 370.

In example embodiments, the hitch 300 may also include braces 340 and 342. The braces 340 and 342 may extend from the first structural member or the plates 330 and 332 to ends of the second structural member 320. The braces 340 and 342 may be made from tube steel, however, other structural members, for example, plates, I-beams, W-beams, channel iron, etc. may alternatively be used. The hitch 300 may further include reinforcing plates 350 and 352 between the braces 340 and 342 and the second tube steel member 320. In one example embodiment, at least one of the plates 350 and 352 may include apertures allowing hoses, for example, hydraulic hoses, to pass therethrough. The hoses may connect to the first actuator 600.

In example embodiments, the hitch 300 may further include a pair of plates 380 which may serve as a connection structure for the first actuator 600. The plates 380 may each include an aperture to allow the first actuator 600 to connect thereto, for example, by pinning.

Figure 5A:
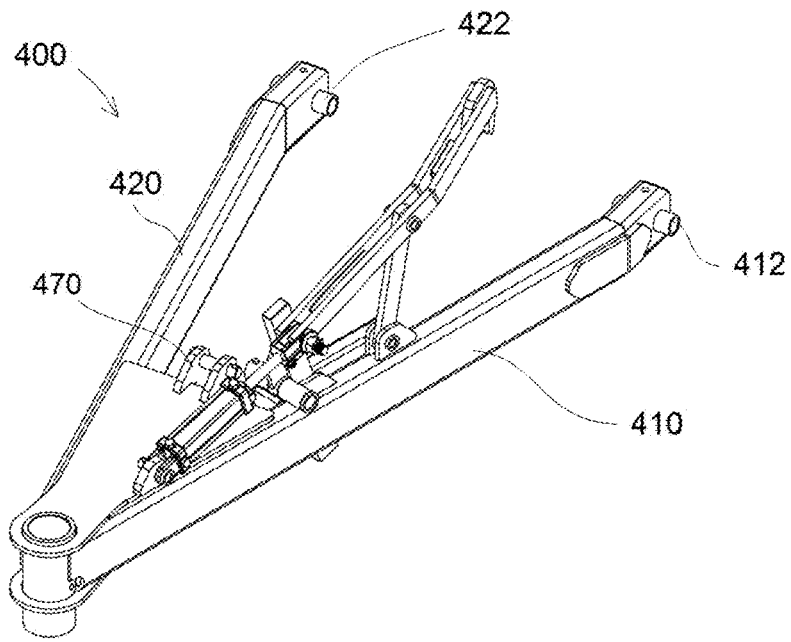
FIGS. 5A-5C are views of a frame in accordance with example embodiments.
Figure 5B:
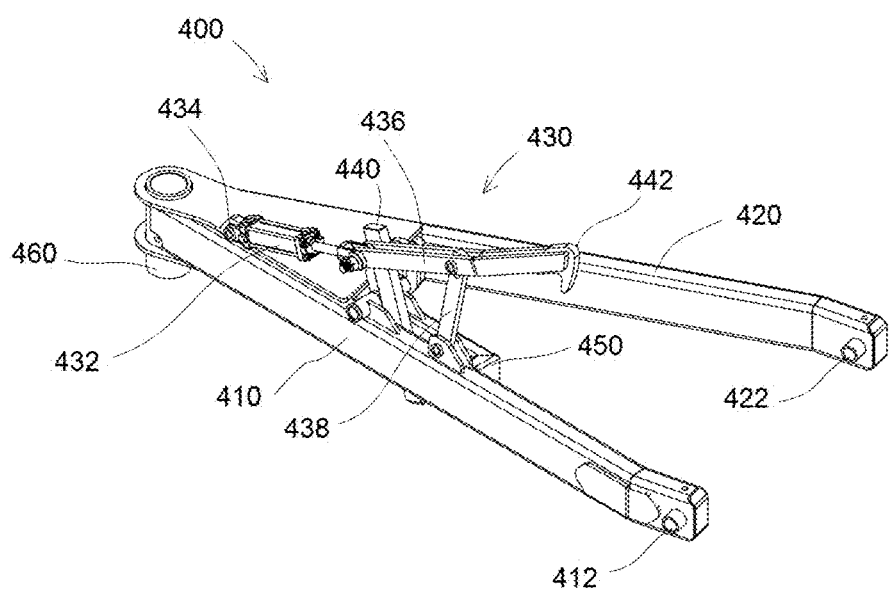
Figure 5C:
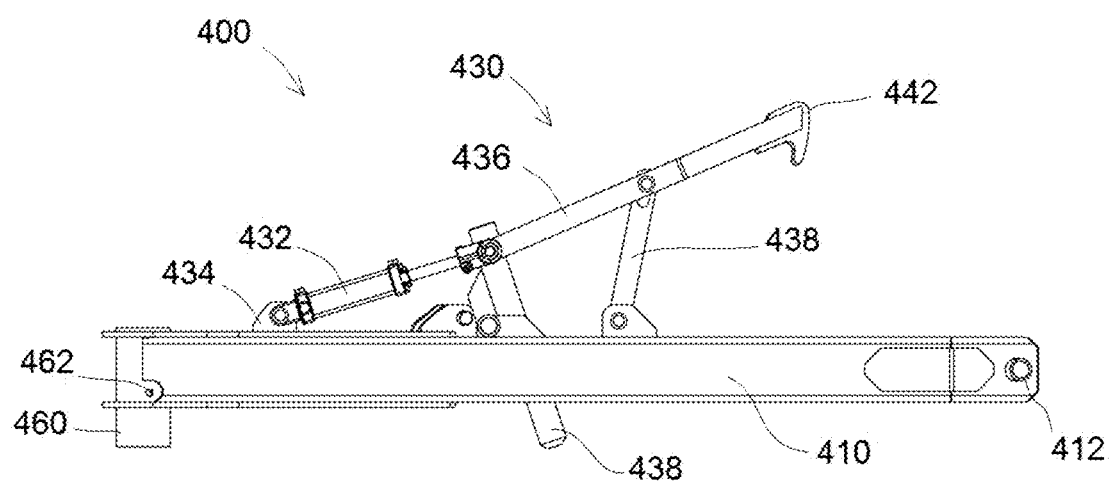

Turning now to FIGS. 5A-5C, it is observed the frame 400 may resemble an A-frame having first leg 410 and a second leg 420 which form a substantially V-shaped structure. The first leg 410 and the second leg 420 may be made from tube steel, however, this is not intended to limit the invention as the first leg 410 and the second leg 420 may be made from a different type of structural member such as, but not limited to, I-beam, W-shaped members, channel iron, and the like. In example embodiments, ends of the first and second legs 410 and 420 may be fitted with connecting members which may be configured to connect the legs 410 and 420 to the hitch 300 in a manner that allows the frame 400 to pivot with respect to the hitch 300. For example, the first leg 410 may include protrusions 412 which may be inserted into holes of the connecting region 360 of the hitch 300. Similarly, the second leg 420 may include protrusions 422 which may be inserted into the holes of the connecting region 370 of the hitch 300. It is understood that the protrusions 412 and 422 are merely examples of structures which may facilitate a pivotal connection between the frame 400 and the hitch 300 but are not intended to limit the invention. For example, the protrusions 412 and 422 may be omitted and ends of the first and second legs 410 and 420 may be formed with holes that allow a pin to connect the ends of the first and second legs 410 and 420 to the connecting regions 360 and 370 of the hitch 300.

In example embodiments, an end of the frame 400 may include a cylindrical structure 460. The cylindrical structure 460 may, for example be configured to interface and/or support a bearing 580 that may be in the wheel 500. For example, the cylindrical structure 460 may receive an end of the bearing 580 and may have a hole 462 which may allow for a pin connection between the bearing 580 and the cylindrical structure 460.

In addition to the above, the frame 400 may include a locking mechanism 430. The locking mechanism 430 may be configured to lock the wheel 500 and keep it from rotating. In the nonlimiting example of FIGS. 5A-5C, the locking mechanism 430 may be comprised of a second actuator 432, a first link 436, a second link 438 pinned to the first link 436, and a locking bar 440. In example embodiments, the second actuator 432 may be, but is not required to be, a hydraulic or pneumatic cylinder. In example embodiments, the second link 438 may be additionally pinned to the first leg 410. In example embodiments, the locking bar 440 may be operatively connected to the second actuator 432 so that as the second actuator 432 operates, the locking bar 440 displaces to lock or unlock the wheel 500 and prevent it or allow it to rotate.

In example embodiments, the frame 400 may include a connecting structure 470. The connecting structure 470 may resemble a pair of plates to which the first actuator 600 may attach. For example, the first actuator 600 may be a hydraulic cylinder and a barrel or a rod of the hydraulic cylinder may be connected to the connecting structure 470 by a pin. This particular manner of connecting the first actuator 600 to the frame 400 is not intended to limit the invention as one skilled in the art would know of several methods and/or structures which allow for a pinned connection between the frame 400 and the first actuator 600.

Turning now to FIGS. 6A-6D, the wheel 500 may be comprised of a pick up structure 530, a trapping structure 510, and a concave region 520 between the pick up structure 530 an the trapping structure 510. One clear difference between the prior art and the wheel 500 of example embodiments is that the wheel 500 of example embodiments includes a concave region 520 rather than a flat cylindrical structure between a pick up structure and a trapping structure.

In example embodiments, the pickup structure 530 may be comprised of an outer ring 532 and an inner ring 534 connected to one another by a plurality of connecting members 536. In example embodiments, the outer ring 532 may be fabricated by bending a pipe, for example, a 1 inch diameter pipe, a 2 inch diameter pipe, or a 3 inch diameter pipe, into a ring. The inner ring 534 may also be formed by a bending pipe into a ring, however, the diameter of the inner ring 534 is smaller than the diameter of the outer ring 532. In example embodiments, the connecting members 536 may be formed from any suitable material such as, but not limited to, plates, bars, pipes or any other member which may suitable connect the outer ring 532 to the inner ring 534. Furthermore, the number of connecting members 536 may vary from one embodiment to another. For example, in FIGS. 6A-6C there are eight connecting members 536 connecting the outer ring 532 to the inner ring 534 whereas in other embodiments there may be more or less than eight connecting members 536 connecting the outer ring 532 to the inner ring 534. It is understood the pickup structure 530 of example embodiments is illustrative only and is not intended to limit the invention. For example, rather than having a pickup structure 530 comprised of an outer ring 532, and inner ring 534, and connecting members 536, the pickup structure 530 may simply be comprised of an annular disk or a full disk.

In example embodiments, the trapping structure 510 may be comprised of a pipe bent into the shape of a ring. For example, in example embodiments a one, two, or three inch pipe may be bent into a ring. It is understood that the trapping structure 510 of example embodiments is exemplary only and is not meant to limit the invention. For example, in example embodiments the trapping structure 510 may alternatively be comprised of a bar bent into the shape of a ring or may be formed from a plate. In this latter embodiment the trapping structure 510 may resemble an annular disk.

In example embodiments the concave region 520 may be comprised of a first ring 522, a second ring 524, and a third ring 526. In example embodiments, the first, second, and third rings 522, 524, and 526 may be formed by bending pipes, for example, one inch diameter, two inch diameter, or three inch diameter pipes, into circular rings. For example, the first ring 522 may resemble a circular ring, the second ring 524 may resemble a circular ring having a diameter smaller than the diameter of the first ring 522, and the third ring 526 may resemble a circular ring having a diameter larger than the diameter of the second ring 524. In example embodiments, outermost surfaces of the first, second, and third rings 522, 524, and 526 may form a concave shape. In one example embodiment, the diameter of the first ring 522 and the diameter of the third ring 526 may be larger than the diameter of the second ring 524. In another embodiment, the diameter of the first ring 522 is larger than the diameter of the second ring 524 which in turn is larger than the diameter of the third ring 526.

In example embodiments, the pickup structure 530, the concave region 520, and the trapping structure 510 may be arranged such that a line L may pass through centers of the pickup structure 530, the concave region 520, and the trapping structure 510.

Figure 6A:
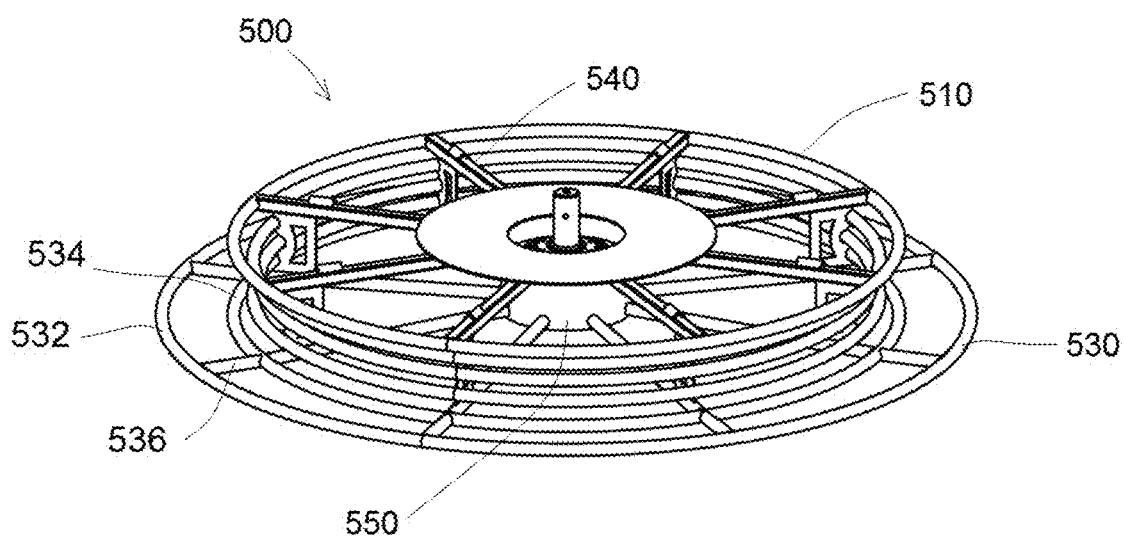
FIGS. 6A-6D are views of a hose mover reel in accordance with example embodiments.
Figure 6B:
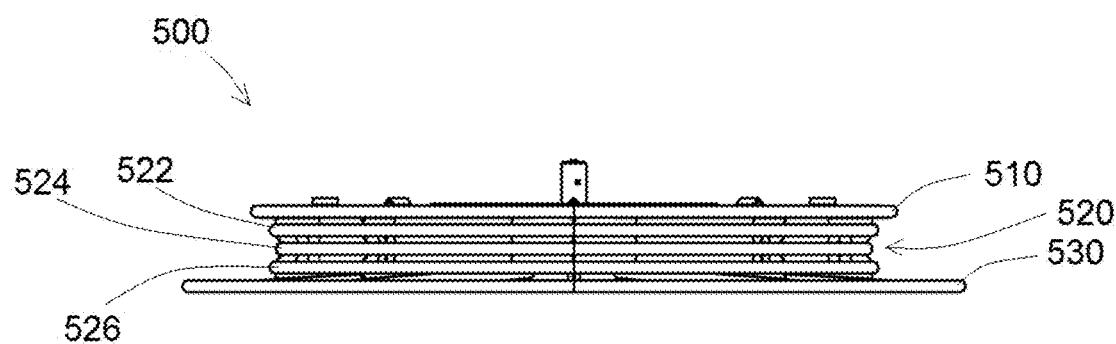
Figure 6C:
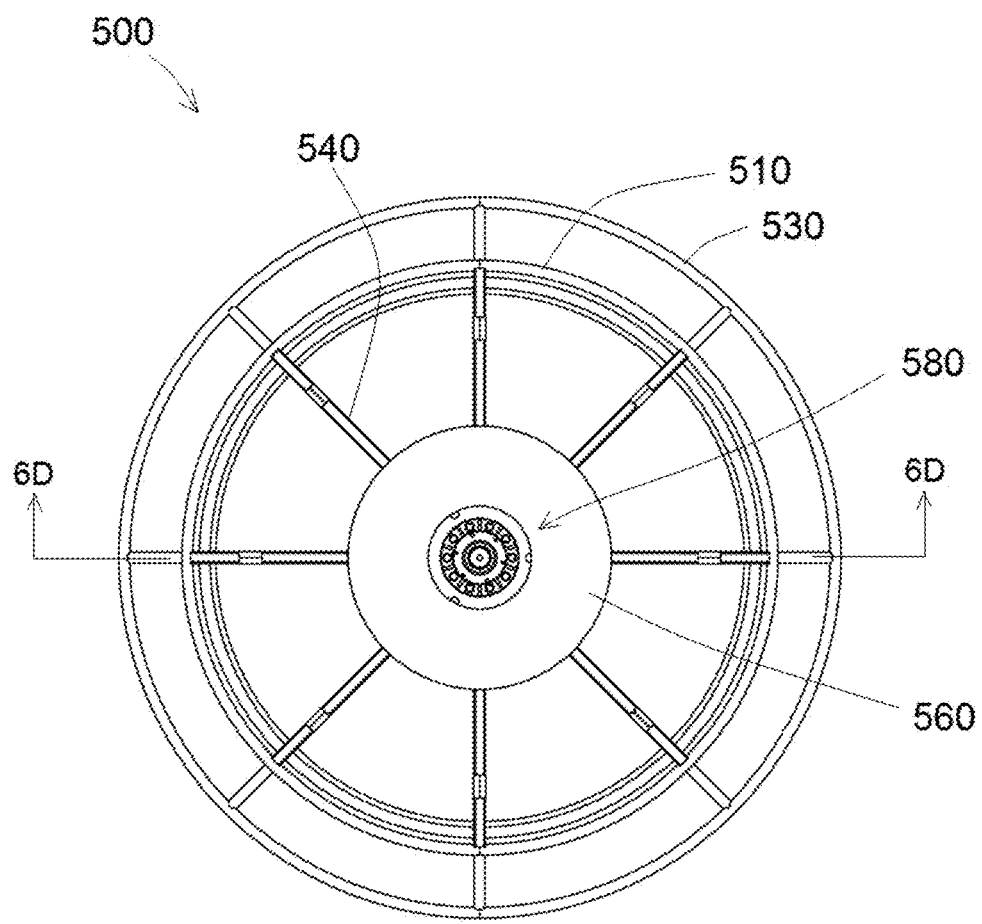
Figure 6D:
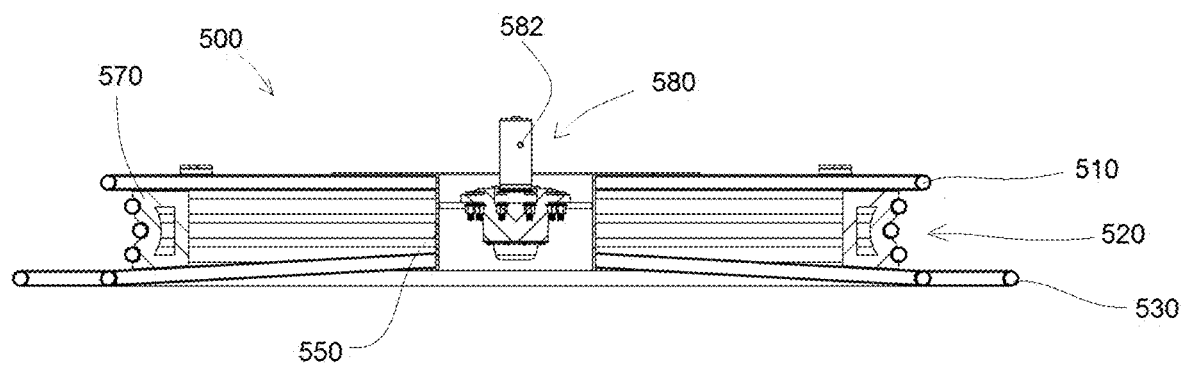

In example embodiments, the wheel 500 may further include a bearing housing 550 enclosing a bearing 580. The bearing 580 may include a shaft which may be inserted into the cylrindrical member 460 of the frame 400 and a pin may be used to connect the bearing 580 to the frame 400 thus allowing the wheel 500 of the hose mover 1000 to rotate as conventional hose movers do. In example embodiments, the bearing housing 550 may resemble a cylinder and various connecting members may connect the pickup structure 530, the concave region 520, and the trapping structure 510 to the bearing housing 580. For example, as shown in FIG. 6D (which is a section view of the wheel 500), plates and bars may be used to connect the pickup structure 530, the rings of the concave region 520, and the trapping structure 510 to the bearing housing 580. It is emphasized the arrangement of FIG. 6D is not intended to limit the invention but to merely show an example of it. For example, whereas the embodiment of FIG. 6D includes a notch shaped plate 570 to which each of the first, second, and third rings 522, 524, and 526 may attach, the hose mover 1000 may be alternatively arranged so that the first and third rings are relatively close to connecting members that are used to connect the pickup structure 530 and the trapping structure 510 to the bearing housing 550 so that the first and third rings 522 and 526 attach to those connecting members rather than a plate 570 and only the second ring 524 attaches to the plate 570.

Figure 7A:
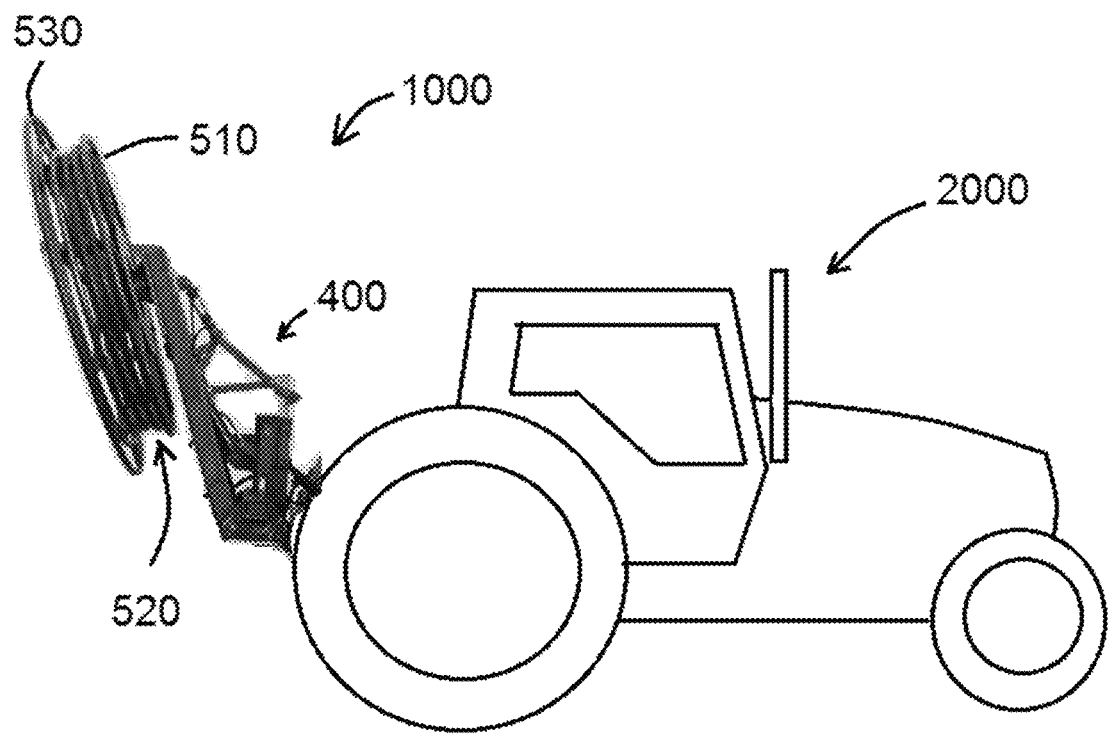
FIGS. 7A and 7B are views of a hose mover attached to a vehicle in accordance with example embodiments.
Figure 7B:
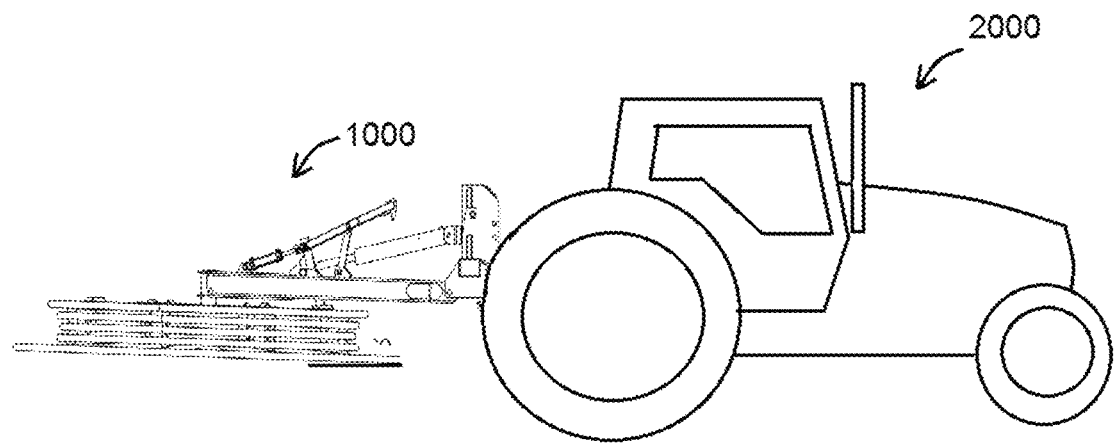
Figure 8A:
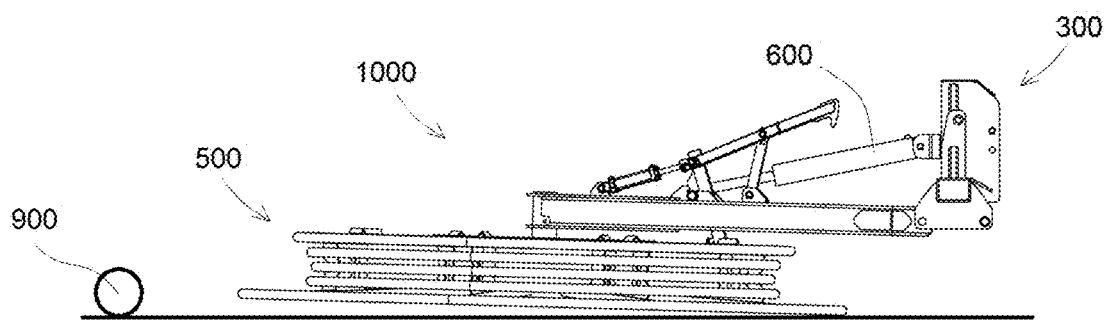
FIGS. 8A and 8B are views of a hose mover near and in contact with a hose in accordance with example embodiments.
Figure 8B:
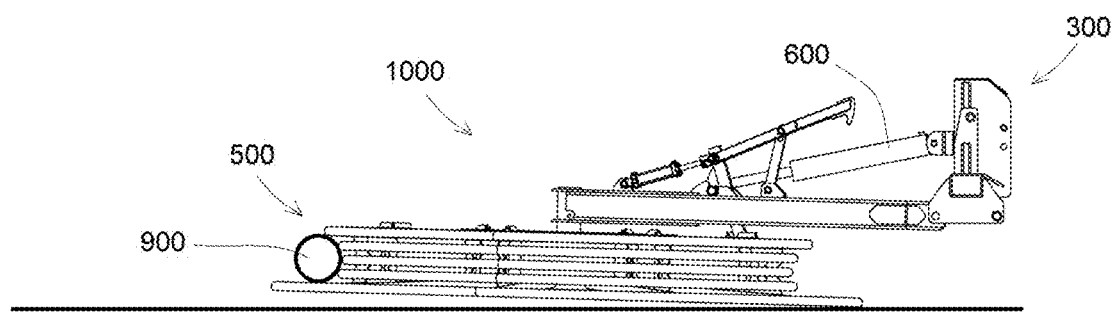

FIGS. 7A and 7B illustrate the hose mover 1000 connected to a tractor 2000 by the three point hitch 300. As explained above, the wheel 500 of the hose mover 1000 may be moved up or down under the influence of the actuator 600. FIG. 7A, for example, shows the wheel 500 rotated to an upward position whereas FIG. 7B shows the wheel in a downward position.

In example embodiments the hose mover 1000 may be positioned near a hose 900 which is resting on the ground. In example embodiments the hose mover 1000 may be manipulated by operation of the tractor 2000 and/or three the point hitch 300 so that the pickup structure 530 of the wheel 500 is inserted underneath or near a bottom of the hose 900. The hose mover 1000 is further moved so the hose 900 is on the pickup structure 530 and thereafter bears against the region 520. The hose 900 is prevented from slipping off the concave region 520 by the trapping structure 510 as shown in FIG. 9B. Furthermore, the concave region 520 may act to better restrain the hose 900 by virtue of the concave points of contact. Furthermore, because the hose mover 1000 of example embodiments uses a concave structure with various spaces therein, accumulation of mud is minimized leading to better control of the hose 900.

Figure 9:
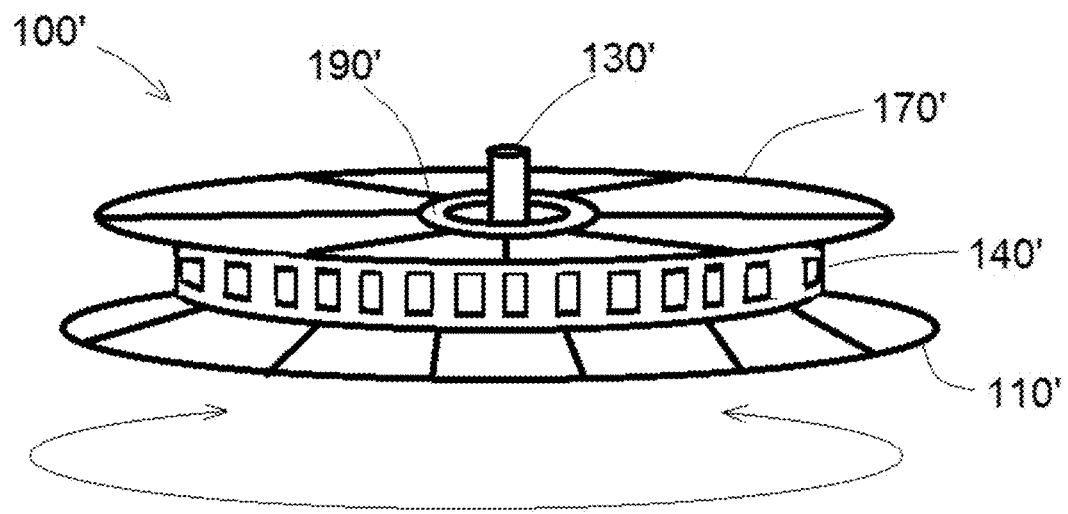
FIG. 9 is a view of a hose mover wheel in accordance with example embodiments.
Figure 10:
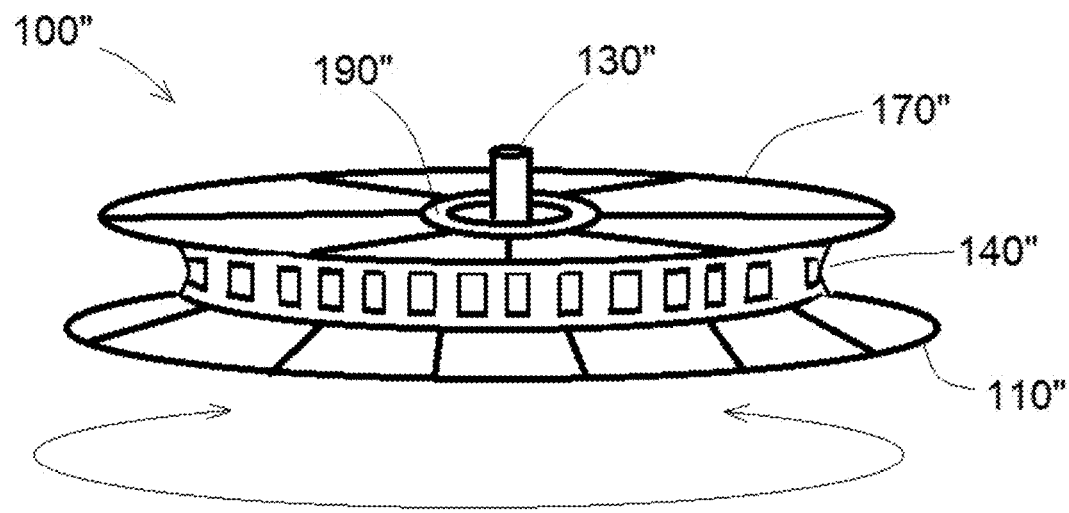
FIG. 10 is a view of a hose mover wheel in accordance with example embodiments.

FIG. 9 is another example of a hose mover wheel 100' in accordance with example embodiments and may be used in place of the wheel 500. In example embodiments, the wheel 100' resembles a conventional hose mover wheel 100 in that it has a pickup structure 110', a trapping structure 170', and a band 140' between the pickup structure 110' and the trapping structure 170', however, in example embodiments the band 140' has apertures sized to allow mud to pass therethrough. FIG. 10 is a view of another inventive hose mover wheel 100". The hose mover wheel 100", like hose mover 100, includes a pickup structure 110", a trapping structure 170", and a band 140" between the pickup structure 110" and the trapping structure 170", however, in example embodiments the band 140" not only has apertures but a concave surface as well to better hold a hose.

Other modifications of the example embodiments are considered to fall within the inventive concepts disclosed herein. For example, in FIGS. 3A-3C and 6A-8B the wheel 500 is illustrated with a concave region 520 formed by three rings 522, 524, and 526, however, the concave region 520 may be formed with more or less than three rings. For example, the concave region 520 may be formed with four rings with the various other structures (for example, plate 570) modified to accommodate the fourth ring. On the other hand, the concave region 520 may be formed with only two rings. For example, ring 524 may be omitted and the resulting structure would still be considered to fall within the inventive concepts. In this latter embodiment, each ring 522 and 526 would be configured so as to simultaneously contact a hose 900 as it is being moved. The multiple points of contact help support the hose 900 and may reduce stress as compared to the conventional art.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A hose mover comprising:
a hitch configured to attach to a vehicle;
a frame pivotally attached to the hitch;
a first actuator configured to pivot the frame with respect to the hitch;
a wheel rotationally connected to the frame, the wheel including
a pick up structure,
a trapping structure, and
a plurality of members between the pick up structure and the trapping structure, the plurality of members forming a concave region between the pick up structure and the trapping structure for receiving a hose, wherein the plurality of members are spaced to allow mud to pass through, wherein the plurality of members formed into rings which are spaced apart and arranged to form the concave region.

2. The hose mover of claim 1, wherein pick up structure resembles a circular ring.

3. The hose mover of claim 1, wherein the trapping structure resembles a circular ring.

4. The hose mover of claim 1, further comprising:
a bearing at an end of the frame, wherein the pick up structure is a circular ring and a centerline passing through the pick up structure is substantially coincident of a centerline passing through the bearing.

5. The hose mover of claim 4, further comprising:
a cylinder surrounding the bearing and
a plurality of attachment members attaching at least one of the pick up structure, the trapping structure, and the plurality of members to the cylinder.

6. A method of moving a hose comprising:
moving the hose mover of claim 1 near a hose resting on the ground;
rotating the pick up structure and the trapping structure to a substantially downward position where the pick up structure and the trapping structure are substantially parallel to the ground by operating an actuator of the hose mover;
arranging the pick up structure under the hose;
moving the hose mover so the hose is against at least two of the members; and
moving the hose.

7. The method of claim 6, wherein the first actuator is a hydraulic cylinder.

8. The hose mover of claim 1, wherein the first actuator is configured to rotate the pick up structure and the trapping structure to a substantially horizontal configuration.

9. The hose mover of claim 1, wherein the plurality of members are a plurality of curved members spaced apart and arranged to form the concave region.

10. The hose mover of claim 1, wherein the plurality of curved members are a plurality pipes bent into a circular shape.

11. The hose mover of claim 1, wherein the plurality of rings is a plurality of bent pipes.

12. A hose mover wheel comprising:
a hitch configured to attach to a vehicle;
a frame pivotally attached to the hitch;
a first actuator configured to pivot the frame with respect to the hitch;
a wheel pivotally connected to an end of the frame, the wheel including
a bearing housing surrounding a bearing;
a pickup structure attached to the bearing housing;
a trapping structure attached to the bearing housing; and
a plurality of spaced apart bent pipes between the pickup structure and the trapping structure, the plurality of bent pipes arranged to form a concave region to receive a hose, wherein the plurality of bent pipes are spaced to allow mud to pass through, wherein the plurality of bent pipes form a plurality of rings.

13. The hose mover according to claim 12, where the plurality of rings are arranged to form spaces that allow mud to pass through.

14. The hose mover according to claim 12, wherein the plurality of bent pipes include a first bent pipe formed into a first ring and a second bent pipe formed into a second ring each having diameters smaller than diameters of the pick up structure and the trapping structure.

15. The hose mover of claim 14, wherein the plurality of bent pipes includes a third bent pipe formed into a third ring having a diameter smaller than the diameters of the first ring and the second ring.

16. The hose mover of claim 15, wherein the third ring is between the first ring and the second ring.

17. The hose mover of claim 15, further comprising:
a plurality of plates connected to the first, second, and third rings.

18. The hose mover of claim 17, wherein the plurality of plates are also connected to the pickup structure and the trapping structure.

19. A hose mover comprising:
a hitch configured to attach to a vehicle;
a frame pivotally attached to the hitch;
a first actuator configured to pivot the frame with respect to the hitch;
a wheel rotationally connected to the frame, the wheel including
a pick up structure comprised of a first ring having a first centerline,
a trapping structure comprised of a second ring having centerline coincident with the first centerline, and
a plurality of members between the pick up structure and the trapping structure, the plurality of members forming a concave region between the pick up structure and the trapping structure for receiving a hose, wherein the plurality of members are spaced to allow mud to pass through; and
a bearing connecting the wheel to the frame, the centerline of the bearing being coincident with the first centerline, wherein the plurality of members includes a plurality of bent pipes and the plurality of bent pipes form a plurality of rings having a centerline coincident with the first centerline.

* * * * *